324-77. SR 03-28-72 XR 3,652,953

United States Patent

Victoreen

[15] 3,652,953

[45] Mar. 28, 1972

[54] AUDIO OSCILLATOR FOR GENERATING EITHER C.W., DAMPED WAVE TRAINS, OR NARROW BAND NOISE

[72] Inventor: John A. Victoreen, 350 N. Maitland Ave., Maitland, Fla. 32751

[22] Filed: Feb. 27, 1970

[21] Appl. No.: 15,093

[52] U.S. Cl. ..................................331/78, 307/261, 324/77, 331/109, 331/110, 331/141, 331/173, 332/50

[51] Int. Cl. .......................................H03b 5/26, H03b 29/00

[58] Field of Search ....................331/78, 109, 110, 141, 183, 331/172–174; 332/50; 324/77, 78; 307/261

[56] References Cited

UNITED STATES PATENTS

| | | | |
|---|---|---|---|
| 3,229,227 | 1/1966 | Popodi | 331/173 X |
| 3,327,044 | 6/1967 | Markowitz | 331/78 X |
| 3,363,198 | 1/1968 | Davies | 331/174 X |

*Primary Examiner*—Roy Lake
*Assistant Examiner*—Siegfried H. Grimm
*Attorney*—J. D. Douglass

[57] ABSTRACT

A signal generator is provided for generating audible C.W., damped wave trains, narrow band noise pulses. It includes an RC coupled oscillatory circuit, the frequency of which may be controlled in the audio frequency range and the gain of which may be controlled to cause it either to oscillate or bring it close to the oscillation point. Signal injector and removing means is connected to the oscillator circuit input and output, these portions being so connected and proportioned and the phase being such that the injected exciting signal is cancelled from the output signal. The signal generated within the oscillatory circuit is a composite of the injected signal and the signal generated by the oscillatory circuit. The injected signal may be a sawtooth shaped wave which will then cause a damped wave train to appear in the output. It can also be a white noise signal which results in a narrow band noise signal occurring in the output. The band width of the noise signal in the output is determined by the Q of the oscillatory circuit. The Q of the circuit can be measured by generating damped wave signals and measuring the decrement of the signal produced, and therefore the value of the band width of the noise signals passed by the circuit can be determined.

9 Claims, 4 Drawing Figures

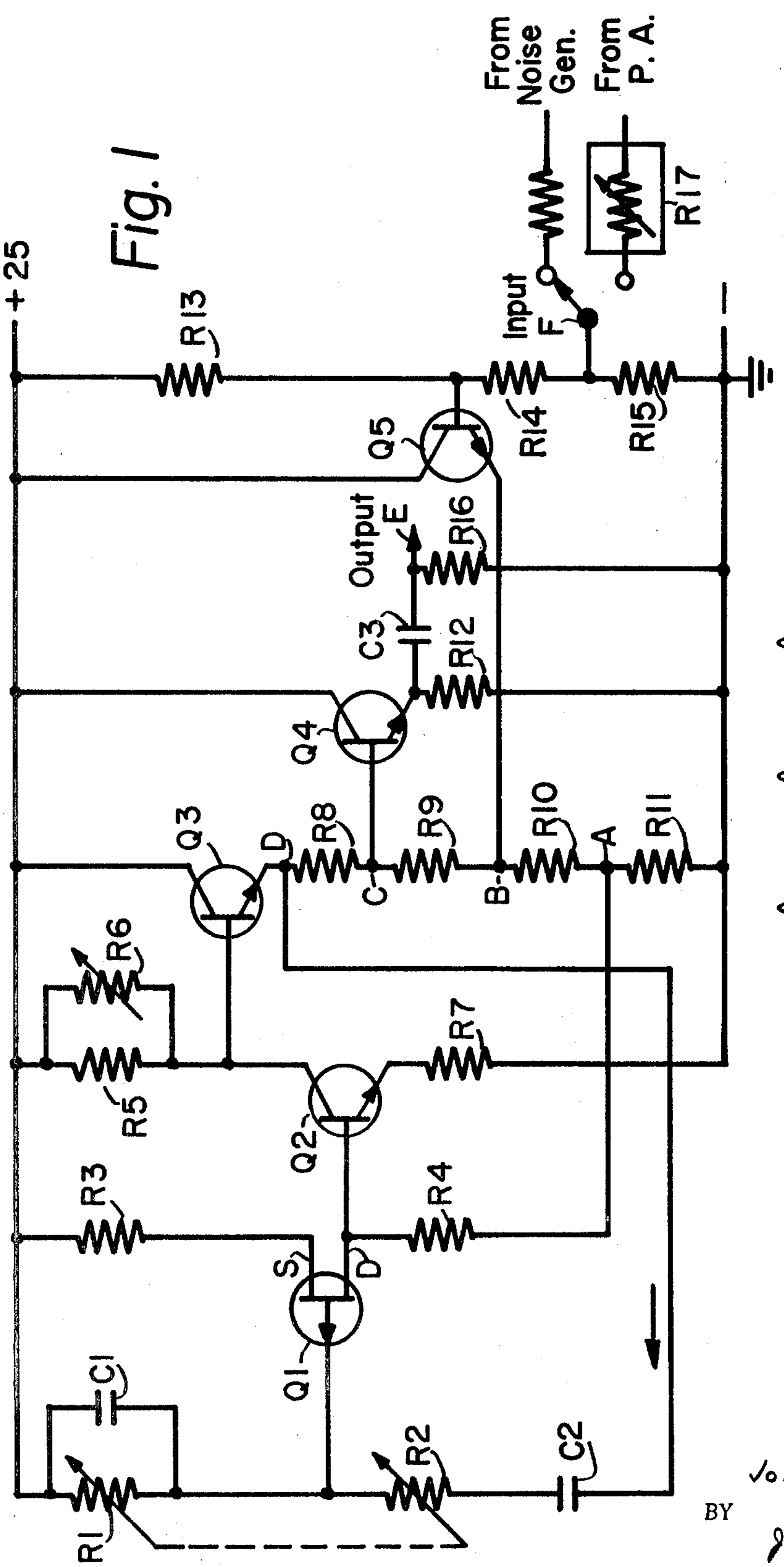
Fig. I
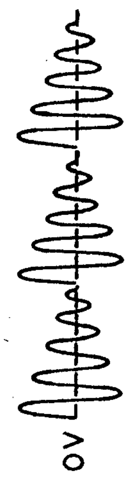
Fig. 4
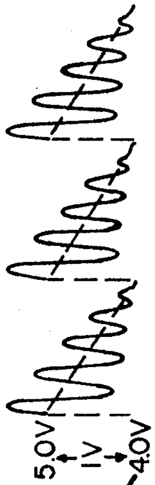
Fig. 3
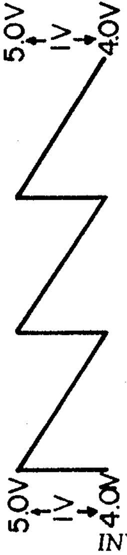
Fig. 2
INVENTOR.
John A. Victoreen
BY
J. D. Douglas
His atty

AUDIO OSCILLATOR FOR GENERATING EITHER C.W., DAMPED WAVE TRAINS, OR NARROW BAND NOISE

This invention relates to a method and apparatus for generating audible signals and more particularly to a generator which may be used as a signal source to ultimately drive a transducer for generating sound waves for the free field testing of hearing.

Heretofore it has been proposed to test hearing by generating pure tones or by generating narrow band white noise signals which have been applied to a transducer and the results on the patient determined subjectively. Pure tones have proved to be of questionable value due to the fact that the ear is discriminatory as to certain frequencies with the result that the results obtained were uncertain. The use of narrow band noise signals although desirable, as being used today, introduces a problem because of the difficulty of defining or proving the band width or spectrum of the noise which prevents accurate calibration of the generators which in turn prevent the operator from obtaining or duplicating results or even making two generators with a definable output.

The present invention contemplates the construction of a generator which can be adjusted to provide pure tones, damped wave trains and narrow band noise signals. It is particularly valuable for free field testing because it can be calibrated and other generators produced that can provide an identical output, thus enabling signals to be generated having predetermined spectral distribution.

In its broader aspect, the invention contemplates a signal generator which is an oscillator circuit of the RC type which oscillates or tends to oscillate by virtue of positive feedback from its low impedance output circuit. The oscillatory circuit has a frequency control and a gain control, the latter being adjustable to enable the production of continuous waves or else to enable the gain to be reduced to just below the point of oscillation. A signal injector coupler is provided connected to the oscillatory circuit whereby an exciting signal may be used to excite the circuit, when it is adjusted below the point of oscillation, to cause it to generate a desired signal. Means is provided to extract the generated signal from the output and discard the exciting signal. Thus, the apparatus is capable of self-generating C.W. signals or damped wave trains and continuous or pulsed noise signals of limited spectral distribution are obtained when a white noise signal is injected from an external source.

One particular advantage of the method and apparatus resides in the fact that it can be caused to generate damped wave trains and then without adjustment of its frequency characteristics it can again be used to generate noise signals which have a definite band width which is related to the Q of the circuit which was determined while generating damped wave trains.

Still other advantages of the invention and the invention itself will become more apparent from the following description of an embodiment thereof which is illustrated by the accompanying drawings.

In the drawings:

FIG. 1 is a schematic diagram of the generator;

FIG. 2 is a wave form used to excite the generator to produce damped waves;

FIG. 3 is a composite wave form showing the exciting and generation wave; and

FIG. 4 illustrates the damped wave output.

The oscillatory section is an R.C. coupled circuit, the frequency of which is controllable over a wide band of audio frequencies and may include a P type FET transistor $Q_1$ (or other device having a relatively high impedance input) having its gate connected to the junction of a pair of series connected frequency determining circuits of the RC type, the upper one being a variable resistance $R_1$ in parallel with a condenser $C_1$, and the lower one being the variable resistance $R_2$ in series with a condenser $C_2$. The sliders of the variable resistors are preferably ganged together as indicated to enable the frequency to be controlled. The source electrode of $Q_1$ is connected through a resistor $R_3$ to a line running to the positive voltage supply which may be 25 volts. The drain electrode of $Q_1$ connects to the base of an NPN transistor $Q_2$ connected as an amplifier. The collector of $Q_2$ connects to positive of the battery through a load resistance $R_5$ shunted by a variable resistance $R_6$ by which the gain of the circuit may be controlled. The emitter of $Q_2$ connects through the resistor $R_7$ to the negative or ground. The collector of $Q_2$ connects directly to the base of an NPN transistor $Q_3$ connected as an emitter follower. The collector of $Q_3$ connects to the positive line and the emitter connects back to the lower end of condenser $C_2$ in the frequency determining circuit to provide positive feedback.

It can be seen that the circuit just described is an oscillatory circuit, the frequency of which is controlled by $R_1$–$R_2$, and that it will oscillate and produce a C.W. sinusoidal output at audio frequencies by adjusting the gain control $R_6$. A non-linear resistance $R_{17}$, such as a hot lamp filament, may be disposed in the feedback line from a power amplifier usually used with the circuit to keep the oscillator running and stabilize it to produce a sine wave of constant amplitude. This circuit can be adjusted by the control $R_6$ to produce continuous waves or adjusted to a point just below oscillation and separately excited to produce damped wave trains or to filter applied white noise pulses, generated externally, to a predetermined band width.

One means for exciting the oscillatory circuit includes a signal injector coupler with means to inject and excite the generator and an output with means in the output to remove the exciting signal and leave only the generated signal. The transistor $Q_3$ has a series of resistors $R_8$, $R_9$, $R_{10}$ and $R_{11}$ connected from the emitter to ground, which is negative. An exciting signal may be injected at the junction of resistors $R_9$ and $R_{10}$ at point B from the emitter of an input transistor $Q_5$ connected as an emitter follower. The collector of $Q_5$ connects to positive and the base to the input, which is comprised of resistors $R_{13}$, $R_{14}$ and $R_{15}$ disposed across the input, at the junction of $R_{13}$ and $R_{14}$. The exciting signal from a suitable generator, not shown, is connected to the junction F of $R_{14}$–$R_{15}$ and ground.

The output from the generator is by way of an emitter follower $Q_4$, the base of which is connected to the junction of resistors $R_8$ and $R_9$ at point C. The collector of $Q_4$ is connected to positive and the emitter through the resistor $R_{12}$ to ground. A capacitor $C_3$ connects the emitter to output terminal E which also connects to ground through resistor $R_{16}$.

As stated, the generator may be used to generate damped wave trains; this is effected by adjusting the gain control $R_6$ to just below the point of continuous oscillation and applying a sawtooth signal to the input at point F and ground.

Prior to the signal injection, there was a quiescent current from the emitter of $Q_3$ through the string of resistors to ground. The sawtooth wave, being applied is transmitted through $Q_5$ to the junction of resistors $R_9$ and $R_{10}$ at point B, the voltage at this point rises as the signal rises. From point B, the signal goes through resistor $R_{10}$ and at the point A is taken off and applied through $R_4$ to the base of $Q_2$. $Q_2$ being an amplifier, amplifies the signal and applies it to the base of $Q_3$ which is an emitter follower. Then the signal from the emitter of $Q_3$ is taken off at point D and fed back to the bottom of $C_2$ which is in series with $R_2$, which along with the upper RC circuit has been adjusted to provide the desired frequency response. This increases the quiescent charge on $C_2$ and $C_1$ and they charge up slowly. When the sawtooth signal changes abruptly, it leaves $C_1$ and $C_2$ charged so that equalization between them must eventually occur.

The charge on $C_1$ leaks off through $R_1$ changing the potential on $C_1$ to a lower value. This results in a feedback through $Q_3$ increasing the charge on $C_2$. When $C_1$ has discharged, no further feedback occurs and $C_2$ discharges into the input circuit of $C_1$, causing a partial recharge of $C_1$.

The potential at A is determined by the triggering signal, which as stated, may be of a sawtooth wave form, as shown in FIG. 2. Thus, it is slowly lowered during a recycling time T at the end of which it rapidly increases to its original value. The rapidly rising signal at B, taken off at A, and applied to $Q_2$ causes the R.C. circuit to ring by the oscillatory charge from $C_1$ and $C_2$ and back. Since the signal is a decreasing one, and it is the signal that causes the oscillatory circuit to break into and maintain oscillation concurrent with the injected signal, the amplitude of the oscillation decreases with the lowering of the input signal and thus becomes a damped wave train having a sinusoidal varying component superimposed on the injected signal plus the steady state DC potential of the circuit, as shown in FIG. 3. This is the signal that appears at point D, the emitter of the emitter follower $Q_3$.

There now remains the cancellation of the injected signal (FIG. 2) and finally the removal of the quiescent potential to provide the damped wave trains (FIG. 4) at the output E. The signal at point D flows downward through the resistor $R_8$ to point C. At the same time the injected signal (FIG. 2) is being applied to point B and travels upward to point C. By locating point C between point B and D where the sawtooth components are equal and of opposite polarity, which is determined by choosing the ratio of $R_8$ and $R_9$, the opposite polarity components cancel out at C, leaving only the quiescent current plus the damped wave signal generated within the ringing circuit.

The resultant signal at point C is applied to the base of the emitter follower $Q_4$ and is taken off at the emitter of $Q_4$ through the condenser $C_3$ where the DC component is removed and appears at the output E as a damped wave train, as shown in FIG. 4.

As previously stated, the circuit is useful in producing a continuous or pulsed noise signal. A white noise signal is generally considered to consist of a substantially infinite number of frequency components with a substantially infinitely variable amplitude. Such a signal can be applied to the generator with the generator adjusted to just below the point of self generation and will energize the generator to provide a narrow frequency band noise signal and an output which is a signal comprised of a random assortment of non-repetitive components of an infinite variety of sizes and frequency but wherein the frequencies above and below a certain specified frequency are reduced in amplitude according to the Q of the circuit when it is acting as a filter.

Heretofore the problem has been that there was no good means for describing such a signal in such a manner that a noise generator could be calibrated with any meaningful calibration. Thus, it was difficult to make any two generators that are just alike or as between two or more generators to be able to generate signals of a specific relative value.

However, I have discovered that the spectral distribution of a narrow band noise signal generated by this device can be measured in terms of $Q = X/R$, where $X$ equals the reactance and $R$ equals the resistance, by injecting a sawtooth wave and generating a damped wave train signal, the decrement of which may be measured by means of the equation $\sigma = \log \pi/Q$ and then substituting a white noise signal for the sawtooth wave. This converts the white noise to narrow band noise, the spectral distribution of which is determined by the Q of the circuit because the circuit acts as a resonant frequency filter.

Likewise, a pulsed white noise signal may be substituted for the sawtooth wave and the output will be pulses of narrow band noise which are definable in terms of the circuit Q.

What is claimed is:

1. The method of generating audio frequency signals from an oscillatory circuit which comprises adjusting the circuit to just below the point of continuous oscillation, injecting a signal into the oscillatory circuit to cause it to generate a temporary oscillation signal, the character of which is controlled by the infected signal, amplifying the superimposed injected and oscillation signals causing said injected signal and the amplified injected signal to cancel each other in the output and removing the oscillation signal.

2. The method as described in claim 1, wherein the injected signal is a sawtooth wave and the removed oscillation signal is a damped wave train.

3. The method as described in claim 1, wherein the injected signal is white noise and the removed oscillation signal is narrow band noise determined by the Q characteristics of the frequency determining portion of the oscillatory circuit.

4. The method as described in claim 3, wherein the white noise signal is a pulsed white noise signal.

5. The method of determining the spectral distribution of components contained within a generated narrow band noise signal which comprises measuring the decrement of a generated damped wave train signal produced by a filter used as a wave train generator, using the generator as a filter for passing parts of a white noise signal and relating the decrement, $\sigma$ of the filter when generating damped wave trains to pass band properties defined by, Q, through the relation $\sigma = \log \pi/Q$ when the filter is passing the noise signal.

6. An apparatus for generating audio frequency signals comprising an oscillatory circuit including an amplifier with means to adjust the frequency and gain and having an input and an output, means for injecting a signal into the input of said circuit to cause it to oscillate under control of the injected signal to provide a composite signal composed of the injected signal and the signal generated by the oscillatory circuit, means for extracting a signal from the circuit output comprising a means for cancelling the injected signal and extracting the generated signal.

7. An apparatus as described in claim 6, wherein said oscillatory circuit is a resistance-capacitance oscillator and means is provided to enable the gain to be adjusted to close to and below the point of continuous oscillation.

8. An apparatus as described in claim 6, wherein the means for extracting and injecting the signal comprises voltage divider means disposed across the input and output of the oscillatory circuit, said voltage divider means comprising a first portion having an emitter follower means connected thereto, a second voltage divider portion connected to the first portion and the emitter follower and said first portion conducting said composite signal toward the emitter follower and said second portion conducting signals from the source of an injected signal toward the emitter follower, a third voltage divider portion connected to the end of the second voltage divider portion and having the other end connected to the amplifier, the part of the signal derived from the input in said second portion being out-of-phase with the part that was amplified and is present in the first portion and a second emitter follower means connected to the junction of the second and third voltage divider portions for injecting the signal to the input of the generator.

9. An apparatus as described in claim 7, where a source of an input signal is provided and develops an input signal for injection into the oscillator, said signal extracting means includes an emitter follower in the output of the oscillator and voltage divider resistance means disposed across the output of the emitter follower and comprising a voltage divider portion for developing an output thereacross and a portion of said voltage divider being connected to the oscillator for transmitting an input signal to the oscillator to control the oscillator, and a portion of said voltage divider connected to said emitter follower to develop a signal from the input which is out-of-phase with the portion of the signal from the output of the oscillator circuit that is of the same character as the input signal, the ratio of the resistance of the part transmitting the composite signal and the part where the out-of-phase signal is developed being such that the input signal is cancelled from the output.

* * * * *

UNITED STATES PATENT OFFICE
CERTIFICATE OF CORRECTION

Patent No. 3,652,953 Dated March 28, 1972

Inventor(s) John A. Victoreen

It is certified that error appears in the above-identified patent and that said Letters Patent are hereby corrected as shown below:

In the claims:

Col 3, line 69, "infected" should be -injected-.

Signed and sealed this 15th day of August 1972.

(SEAL)
Attest:

EDWARD M.FLETCHER,JR.
Attesting Officer

ROBERT GOTTSCHALK
Commissioner of Patents